July 26, 1927.
J. A. GUAY
FRICTION CLUTCH
Filed Oct. 19, 1925
1,637,184
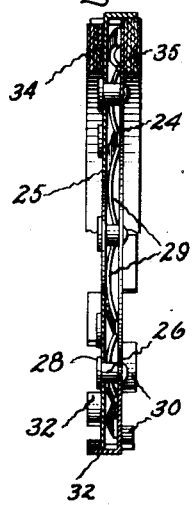
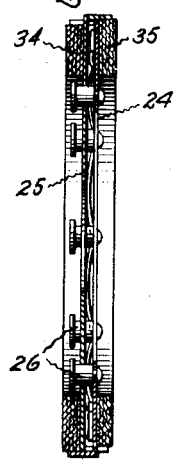
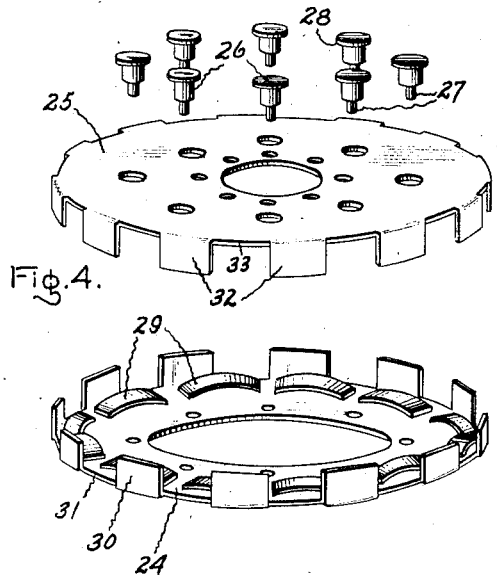
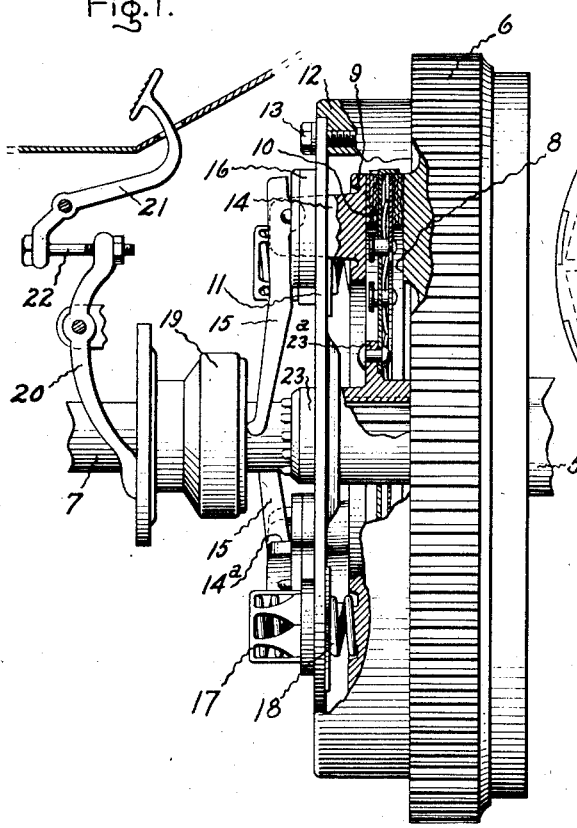
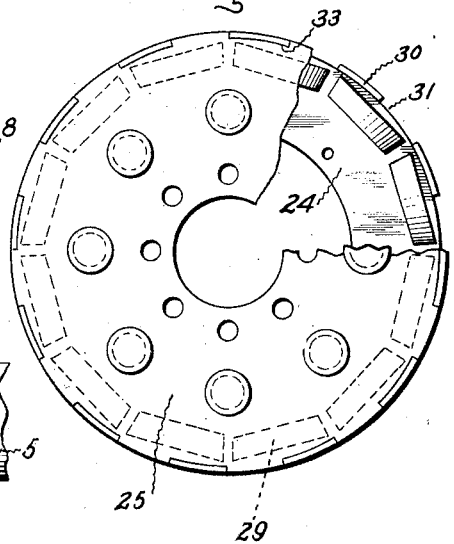
Inventor:
Joseph A. Guay.
by His Attorney.

Patented July 26, 1927.

1,637,184

UNITED STATES PATENT OFFICE.

JOSEPH ARTHUR GUAY, OF LYNN, MASSACHUSETTS.

FRICTION CLUTCH.

Application filed October 19, 1925. Serial No. 63,397.

The present invention relates to friction clutches such as are used in connection with automobiles, for example, for connecting the driving shaft to the driven shaft.

The object of my invention is to provide an improved friction clutch including especially an improved clutch plate structure whereby are obtained advantages in operation as are hereinafter pointed out, and for a consideration of what I believe to be novel and my invention, attention is directed to the following description and the claims appended thereto.

In the drawing, Fig. 1 is a side elevation, partly in section, of a clutch structure embodying my invention; Fig. 2 is a sectional view of a clutch plate; Fig. 3 is a view similar to Fig. 2 but showing the parts in a different position; Fig. 4 is an exploded perspective view of certain of the parts which go to make up the clutch plate, and Fig. 5 is a face view of the clutch plate with a section of one of the parts broken away.

My invention may be embodied in friction clutches of numerous specific types. In the present instance, I have illustrated it by way of example, in a clutch structure of a type invented by me and which forms the subject matter of my application Serial No. 52,407, filed August 25, 1925. Also, I have illustrated it in an automobile clutch, as the invention possesses particular utility for this application.

Referring to the drawing, 5 indicates a crank shaft of an automobile engine, 6 the fly wheel carried thereby, and 7 the driven shaft which functions in the driving of the rear wheels. On the fly wheel is an annular friction surface 8, and adjacent thereto is a ring 9 having a cooperating annular friction surface 10. Friction ring 9 is carried by and is driven by a cover plate 11 which is attached to a flange 12 on the fly wheel by a ring of studs 13. The connection of ring 9 to the cover plate 11 is through the intermediary of a plurality of circumferentially spaced posts 14 on the ring which project through openings in the plate. In the outer ends of posts 14 are slots 14ª in which are pivoted operating arms 15. Surrounding the openings in the plate are collars 16, the edges of which form fulcrums for the operating arms. Fastened to the cover plate 11 are a plurality of circumferentially spaced cages 17 in which are located springs 18, the springs at one end engaging the ends of the spring cages and at the other ends engaging friction ring 9. The springs 18 serve to force friction ring 9 toward the friction surface 8 on the fly wheel. On the driven shaft 7 is a member 19 adapted to be moved by a forked pivoted lever 20 to force the inner ends of arms 15 inward and thus move clutch ring 9 away from friction surface 8 to throw the clutch to "out" position. Lever 20 is moved by means of a foot pedal 21 to which it is connected by a link 22. When member 19 moves the inner ends of arms 15 inward, the arms pivot on the radially inner edges of collars 16, the clutch ring 9 moving against the action of springs 18. Splined on shaft 7 is a sleeve 23 provided with a collar 23ª to which is fastened a clutch plate, the peripheral edge of which stands between friction surfaces 8 and 10.

The clutch plate comprises two parallel opposed disks 24 and 25 connected together by a ring of circumferentially spaced studs 26, the arrangement being such that the two disks can move toward and away from each other to a limited extent. In the present instance, the studs are reduced in diameter at one end as is indicated at 27 and such ends extend through openings in disk 24 and are riveted over so that the studs are fixed permanently to disk 24. The other ends of studs 26 extend loosely through openings in disk 25 and have flanges 28 which engage the outer surface of disk 25. Arranged between disks 24 and 25 are a number of spring members 29 which serve to force disks 24 and 25 apart, the spring members holding disk 25 in engagement with flanges 28. The spring members may be, with advantage, in the form of short curved spring plates. They are arranged in a circle at the periphery of disks 24 and 25, and just outside the ring of studs 26.

Disk 24 is provided at its edge with a series of spaced inwardly projecting fingers 30 between which are notches 31, and disk 25 is provided at its edge with similar spaced inwardly projecting fingers 32 which lie in notches 31, the fingers 30 lying in similar notches 33 located between fingers 32. The notches are of a depth equal to the thickness of the fingers so that the completed clutch plate has a smooth peripheral edge. The fingers 30 project slightly beyond the outer face of disk 25 and the fingers 32 project slightly beyond the outer face of disk 24. These projecting finger ends serve to hold in place rings of clutch facing 34 and 35 which may be made of any suitable clutch facing material. In Fig. 2 a portion of the clutch facing ring is broken away in order to illustrate more clearly the structure. The projecting fingers serve to close the space between the disks 24 and 25 at the periphery of the clutch plate and to connect the disks 24 and 25 together. However, they do not interfere with the movements of disks 24 and 25 toward and away from each other. The clutch plate is of a diameter such that fingers 30 and 32 are beyond the outer edges of friction surfaces 8 and 10 so that they do not interfere with the movements of clutch ring 9 toward and away from the fly wheel friction surface 8.

The springs 18 which force clutch ring 9 to "in" position are substantially stronger than are the spring members 29 so that when the clutch is in "in" position as is shown in Fig. 1, disks 24 and 25 are squeezed together, springs 29 being partially or completely flattened out. This is illustrated particularly in Figs. 1 and 3. The clutch now functions in the usual manner, shaft 5 driving shaft 7 through friction surfaces 8 and 10 and the clutch plate. So far as the driving action is concerned, disks 24 and 25 serve as a unitary structure by reason of the connections between the fingers 30 and 32. When the clutch is thrown to "out" position by moving member 19 inward to force clutch ring 9 away from friction surface 8 so as to release the clutch plate, spring members 29 force the clutch disks 24 and 25 apart so that they occupy the positions shown in Fig. 2. Now when the clutch is let "in" again, it being let in slowly as is well understood, the clutch disks will be squeezed together as springs 29 are compressed, and, due to this, the clutch will not take hold quickly but will take hold very gradually, the yielding of springs 29 permitting the clutch to slip until they are completely compressed, that is, compressed as far as the springs 18 will compress them. This means that there is provided an appreciable movement of clutch ring 9 during which as the clutch ring is compressed, the friction between the engaging friction surfaces is increased gradually from a minimum value to a maximum value. As a result, a clutch embodying my invention can be engaged very slowly and evenly and without likelihood of "grabbing."

My clutch has the advantage also, that, when occasion requires, it can be slipped, that is, partially released, with ease and with a high degree of graduation so that the driving shaft may be made to drive the driven shaft over a considerable range of low speeds, that is, speeds lower than that at which the driving shaft is running. This is of utility in that it saves the trouble of shifting gears when it is desired to run slow.

The clutch plate can be manufactured readily at a comparatively low cost since it comprises few parts, all of which are similar in structure and capable of being easily manufactured in quantities. Also the parts are easily assembled. The disks 24 and 25 may be formed from sheet material, the disks being first stamped out with projections extending radially from their peripheries, and the projections then bent to form the fingers 30 and 32. In assembling, the spring members 29 may be placed on one of the disks, as is shown in Fig. 4. The other disk may be then placed on top of it and the two disks squeezed together in a press. Studs 26 then may be put in place, being inserted through the openings in disk 25 and then riveted into the openings in disk 24, completing the structure. The structure does not require that the clutch facings 34 and 35 be attached permanently to the disks as they are held by the ends of fingers 30 and 32. This enables the clutch facings to be renewed readily when they become worn.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. A clutch plate comprising two spaced parallel disks, interleaving fingers on the peripheries of the disks which connect said disks together, the ends of said fingers projecting beyond the surfaces of the disks, clutch facings held by the projecting ends of said fingers, and yielding means located between said disks.

2. A clutch plate comprising two spaced parallel disks, means connecting said disks together which permits them to have a limited amount of movement toward and away from each other, yielding means located between said disks, and projecting means at the peripheries of the disks for holding a clutch facing in place.

3. A clutch plate comprising two spaced parallel disks movable toward and away from each other, yielding means which serves to force said disks apart, means forming stops to limit the relative movement of said disks, and interleaving fingers on the peripheries of said disks which serve to connect said disks together.

4. A clutch plate comprising two spaced parallel members, means connecting said members together which permits them to have a limited amount of movement toward and away from each other, and circumferentially-spaced curved spring plates located between said members tending to force the members apart, said spring plates being flattened between the parallel members when the parallel members are squeezed together whereby the spring plates serve to limit the movement of said members.

5. A clutch plate comprising two spaced parallel disks having clutch facings on their flat outer surfaces, means connecting said disks together which permits them to have a limited amount of movement toward and away from each other, said means being located at the periphery of said disks and serving to cover the space between the disks, and spaced curved spring plates located between said disks and serving to separate them, said plates being adapted to be squeezed flat between the disks when the disks are squeezed together.

6. A clutch plate comprising two spaced parallel disks, interleaving fingers on the peripheries of the disks which connect said disks together and serve to cover the space between the disks, and spaced curved spring plates located between said disks and serving to separate them, said plates being adapted to be squeezed flat between the disks when the disks are squeezed together.

7. A clutch plate comprising two disks of sheet material having integral interleaving fingers at their peripheries which form a driving connection between the disks and serve to cover the space between the disks, clutch facings on the outer surfaces of said disks, curved spring plates located between said disks and tending to separate the disks, said spring plates being adapted to be squeezed flat when the disks are squeezed together, and means connecting said disks which serve to limit their movement away from each other.

In witness whereof, I have hereunto set my hand this 15th day of October, 1925.

JOSEPH ARTHUR GUAY.